United States Patent [19]
Gee et al.

[11] Patent Number: 5,693,985
[45] Date of Patent: Dec. 2, 1997

[54] PROGRAMMABLE TRAILER INDENTIFICATION SYSTEM INTEGRATED INTO A TRUCK TRACTOR AND TRAILER COMMUNICATION SYSTEM

[75] Inventors: Thomas A. Gee, Allen Park; E. James Lane, Highland, both of Mich.

[73] Assignee: Eaton Corporation, Cleveland, Ohio

[21] Appl. No.: 804,586

[22] Filed: Feb. 24, 1997

Related U.S. Application Data

[63] Continuation of Ser. No. 522,005, Aug. 31, 1995, abandoned.

[51] Int. Cl.⁶ .................................................. B60D 1/62
[52] U.S. Cl. .............. 307/9.1; 280/422; 340/825.06
[58] Field of Search ........................ 307/9.1, 10.1; 439/34–36; 280/DIG. 14, 422, 420; 364/423.098, 424.034, 424.037, 424.04, 424.045; 340/425.5, 825.34, 825.3–825.32, 825.06, 310.01, 310.06, 310.08

[56] References Cited

U.S. PATENT DOCUMENTS

| | | | |
|---|---|---|---|
| 4,897,642 | 1/1990 | DiLullo et al. | 340/825.06 |
| 4,897,789 | 1/1990 | King et al. | 364/413.07 |
| 5,025,253 | 6/1991 | DiLullo et al. | 340/825.06 |
| 5,359,522 | 10/1994 | Ryan | 340/825.34 |
| 5,397,924 | 3/1995 | Gee et al. | 307/9.1 |

*Primary Examiner*—Richard T. Elms
*Attorney, Agent, or Firm*—Loren H. Uthoff, Jr.; Howard D. Gordon

[57] ABSTRACT

A trailer electrical monitor function is implemented into a microprocessor based truck tractor and trailer electrical communication system where a programmable memory unit connected to a trailer electronic control unit is used by the trailer electronic control unit to store a trailer identification code, the result of which is connected through an interface circuit to the trailer electronic control unit where the result is then transmitted to a tractor electronic control unit and/or to an external programming unit. The tractor and trailer electronic control units control the state of a plurality of switching devices to establish the appropriate electrical connection into and out of a standard seven pin tractor/trailer electrical connector where high speed data communication links are used for control diagnostics.

1 Claim, 4 Drawing Sheets

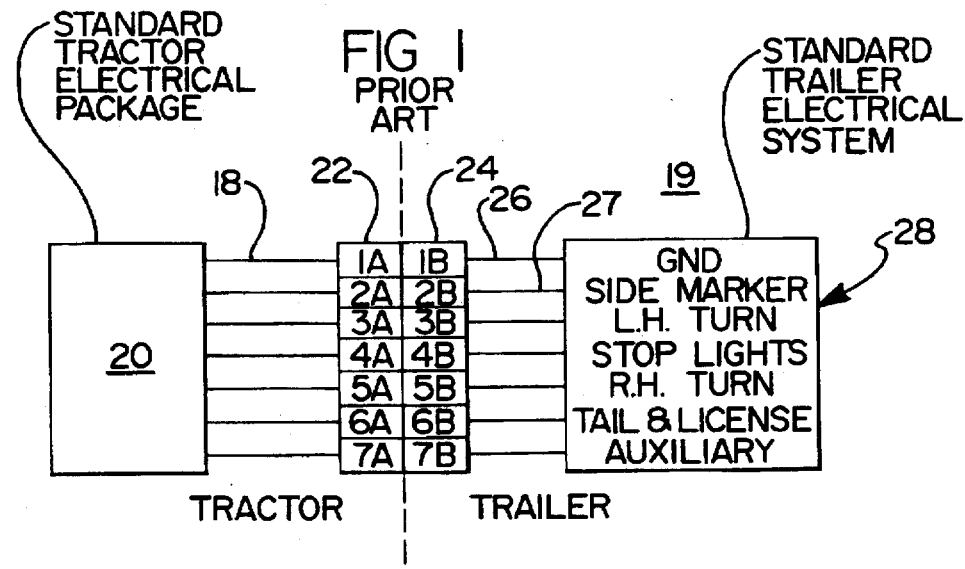
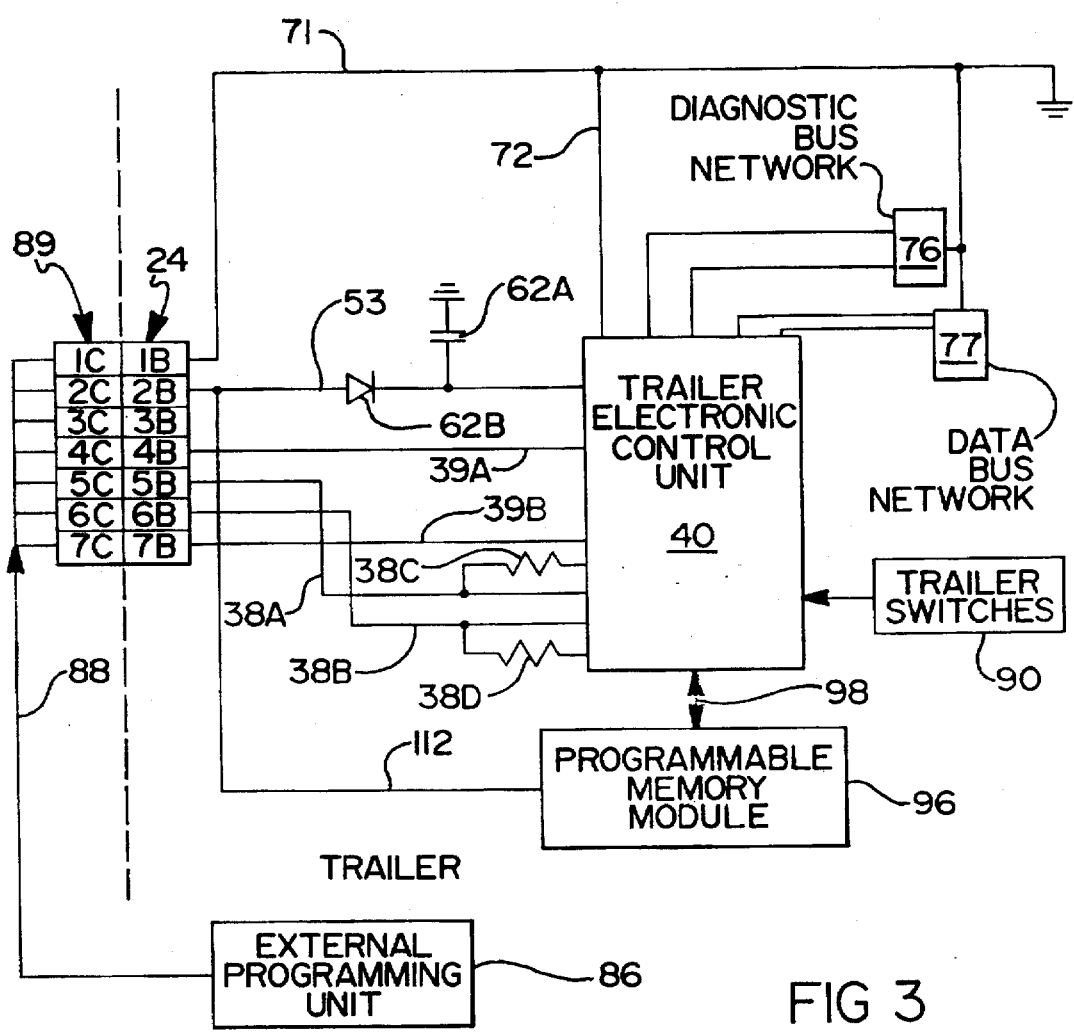

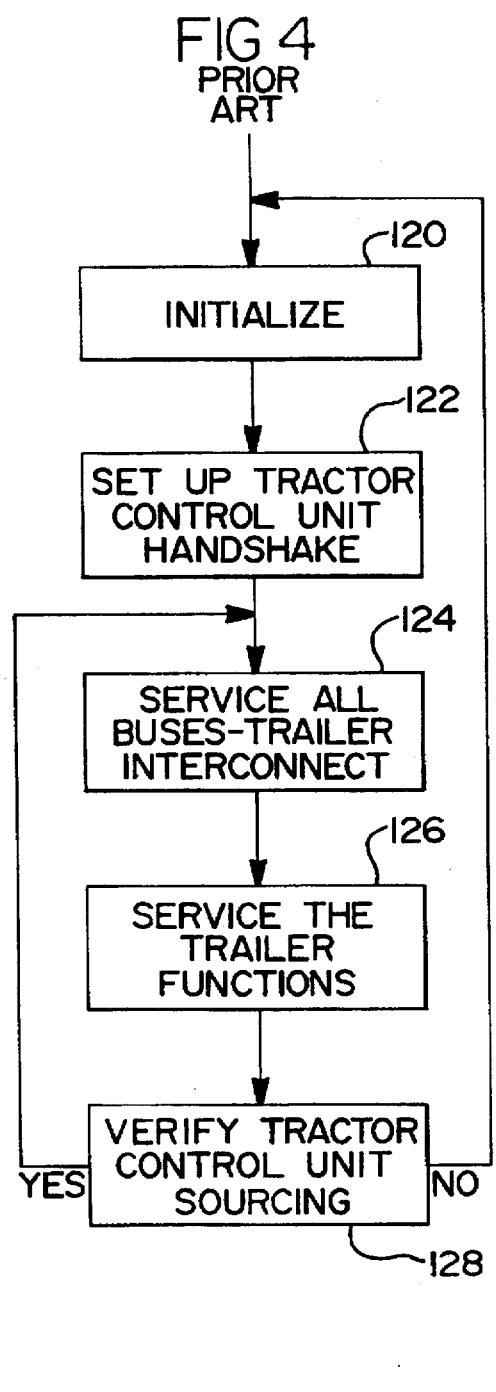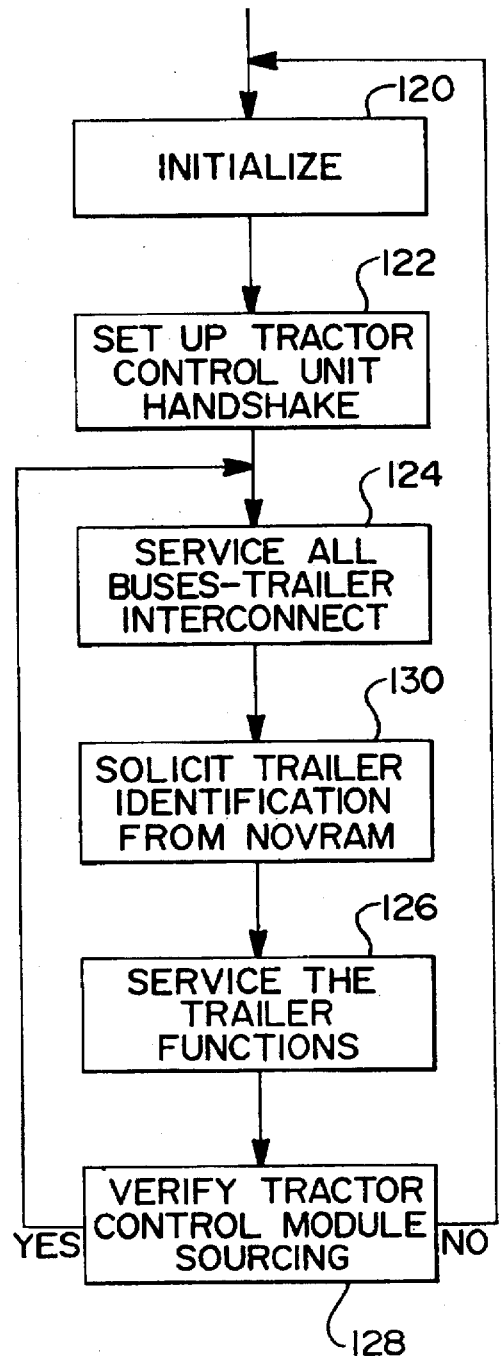

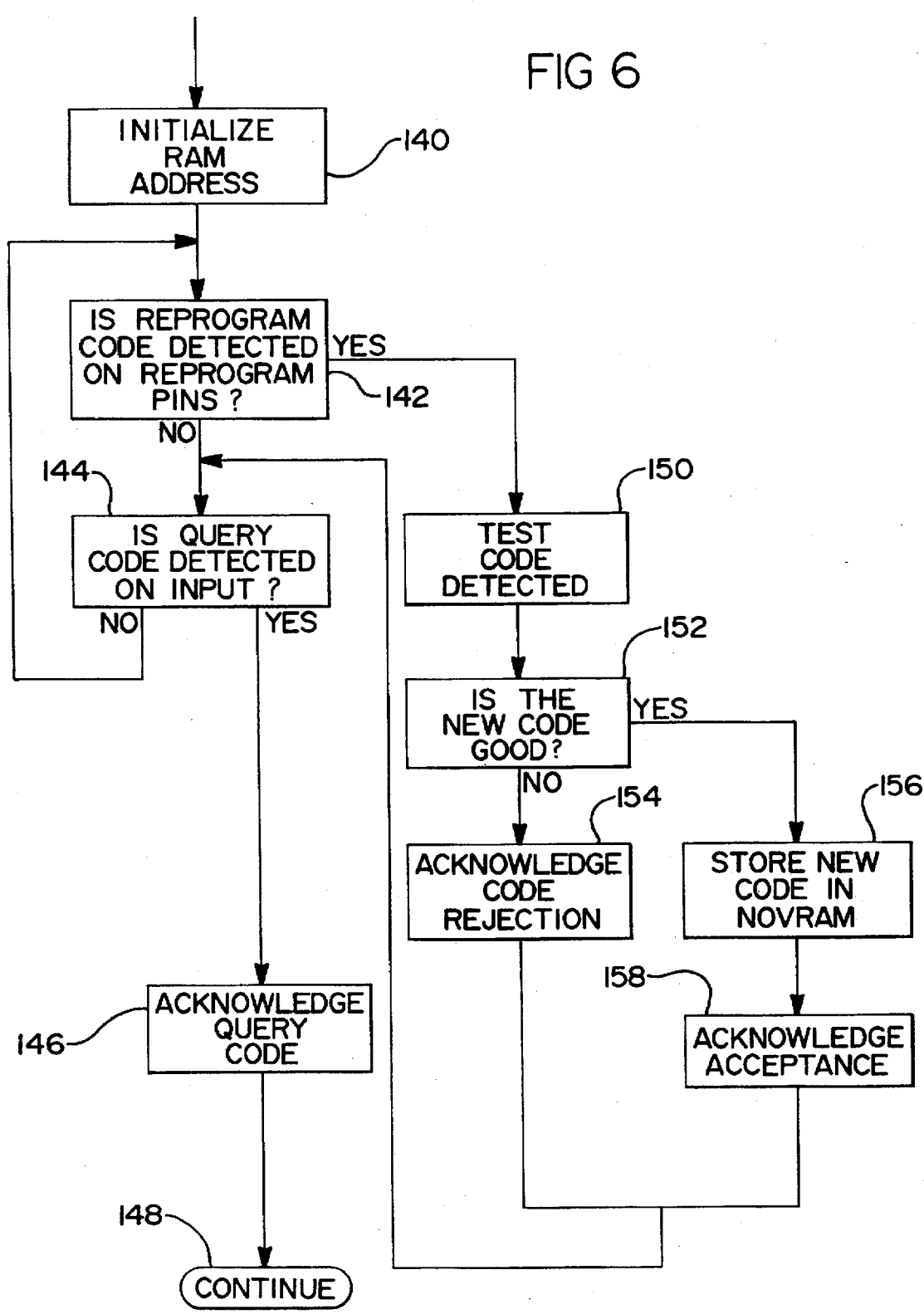

PROGRAMMABLE TRAILER INDENTIFICATION SYSTEM INTEGRATED INTO A TRUCK TRACTOR AND TRAILER COMMUNICATION SYSTEM

This application is a continuation of application Ser. No. 08/522,005, filed Aug. 31, 1995, now abandoned.

RELATED APPLICATIONS

This application is related to application U.S. Ser. No. 08/522,208 entitled "Trailer Auxiliary System Monitor Function For A Truck Tractor and Trailer Electrical Communication System" assigned to the same assignee, Eaton Corporation, as this Application and filed Aug. 31, 1995, now abandoned.

BACKGROUND OF THE INVENTION

This invention relates to a truck tractor and trailer electrical communication system and more specifically to a truck tractor and trailer electrical communication system where an identification code is programmed into a programmable memory unit for later retrieval.

DESCRIPTION OF THE PRIOR ART

Prior to the invention and commercialization of new electrical systems on heavy and medium duty over the road trucks, the requirements for electrical communication between the truck tractor and trailer or semi-trailer could be accommodated with a seven (7) pin connector which has become standard equipment in the industry. This connector provided for the conduction of power to various truck circuits including turn signals, side markers, stop lamps and a ground reference. As a standardized connection scheme, it allows for intermixed connection between various types of tractors and trailers.

The term "tractor" as used herein refers to any truck vehicle which tows an attached vehicle. It therefore includes trucks and truck tractors. It also includes trailers which are equipped to tow other trailers. The term "trailer" as used herein refers to a towed truck vehicle and includes full truck trailers and truck semi-trailers.

The prior art seven pin connector in its standard configuration does not supply any full time electrical power to the trailer. Recently, advances in truck technology have seen the introduction of advanced truck systems such as anti-lock brakes, diagnostics, electronically enhanced braking, trailer anti-swing control and fault detection in addition to traditional auxiliary systems such as refrigeration units. All of these systems would benefit from input power and output signal lines that cannot be handled over the commonly used seven pin connector and from capability to monitor and record the functional history of such systems for display in the cab or using an external display unit. In addition, future tractors and trailers will be equipped with a diagnostic data bus and a high speed data bus probably using one of the Society of Automotive Engineers (SAE) specified protocols with each bus structure requiring two (2) electrical wires. The standard seven pin connector has no provision to allow the addition of the diagnostic or the high speed data bus features between tractors and trailers. A larger connector with an increased number of contact pins could be used, but this solution is impractical since all the trailers not retrofitted with the larger connector would be incompatible with retrofitted tractors. Also, there is no method of monitoring the function of the auxiliary system such that the information can be transmitted to the tractor for display in the cab.

Identification and location of trailers is a process currently accomplished by a succession of entries into a paper logbook as the trailer is moved from pick-up to delivery points and into holding areas. Deficiencies inherent in this type of identification and location procedure make mistakes probable and trailers are routinely misplaced or lost. It would be desirable to incorporate a method of electronic identification of the trailer for display and/or transmission for use by a fleet operator.

Referring to FIG. 1, is an illustration of the prior art electrical connection between a tractor and a trailer where a commonly used seven pin connector package 22 and 24 is used to join a series of electrical socket connectors 1A through 7A respectively to electrical pins 1B through 7B to provide electrical communication between a standard tractor electrical package 20 and a standard trailer electrical package 19 including all of the standard trailer electrical systems 28 such as turn signals, brake lights, side markers and license plate light. The tractor electrical connector 22 joins the tractor normal signal output lines 18 to the trailer electrical connector 24 which is joined to the trailer standard distribution lines 26. The standard connector package consisting of connectors 22 and 24 employs 7 pins and sockets and is used on virtually all North American tractor and trailer combinations intended to be functional when interconnected. The socket and pin (1A–1B) which are designated as the ground wire interconnect are of a larger diameter than the other sockets (2A–7A) and pins (2B–7B). Typically, socket and pin 1A and 1B are fitted with #8 gage wire which has almost double the connection current capacity.

FIG. 2 illustrates a prior art truck tractor and trailer electrical communication system having a tractor electronic control unit 8 located in the tractor joined through 7-pin connectors 22,24 to a trailer electronic control unit 40 located in a trailer. The advanced tractor electrical system 15 employs a tractor electronic control unit 8 which generates and receives sets of electronic signals and controls several sets of electrical switching devices 10A, 10B, 12A, 12B, 13A, 13B and 16 whose states are set by the electronic control unit 8 according to the presence or absence of a compatible system contained on the trailer. Specifically, upon insertion of the tractor electrical connector 22 into the trailer electrical connector 24 or very soon thereafter, the tractor electronic control unit 8 causes the tractor signal switch control line 21B to operate the power switch 10B and tractor signal switch control line 17 to operate signal switches 13A and 13B and causes the tractor normal signal control line 11A to open the tractor normal signal switches 16A, 16B, and 16C. The electronic control unit 8 then outputs an inquiry code signal (query code) onto a pair of tractor electronic control unit output signal lines 25A and 25B through the tractor connector sockets 5A and 6A into trailer connector pins 5B and 6B which is routed into the standard trailer electrical systems 28. When the trailer electrical package 19 is of a conventional configuration, and consists of a standard trailer electrical system 28, then no corresponding code is generated by the trailer electrical package 19 and the tractor electronic control unit 8 configures the tractor electrical system 15 to operate in a standard configuration by opening the series of signal switches 13A and 13B and the powerswitch 10B. Concurrently, the tractor normal signal switches 16A,16B and 16C are closed thereby connecting the standard trailer electrical package 20 through the tractor normal signal output lines 34 into tractor output lines 18 and into the standard connectors 22 and 24 and finally into the conventional trailer electrical package 19. The tractor connector sockets 1A–7A are plugged into so as to electrically conduct through the trailer connector pins 1B–7B. Trailer ground line 13 is connected to the trailer through connector socket 1A and pin 1B.

Electronic control unit diagnostic lines 30A and 30B contain information sufficient to discover problems with the tractor electronic control unit 8 or trailer system signals fed into the tractor electronic control unit 8. The high speed data link lines 32A and 32B can be hooked to another electronic control unit or to other advanced electronic systems either internal or external to the truck to exchange information between the tractor electronic control unit 8 and that other system. Line 9 can be used to route information to the truck cab for communication with the operator.

An alternative embodiment eliminates the plurality of tractor normal signal switches 16,16A, 16B and 16C and tractor output lines 18. The tractor normal signals are routed to the tractor electronic control unit 8 through output lines 34 or through high speed data lines 32A and 32B. The tractor electronic control unit interprets the signals and supplies electrical power to the tractor electrical connector 22 by supplying power individually to the plurality of separate advanced tractor electrical system lines such as 25A,25B, 26A,26B. Individual tractor signal control lines 17 are used to control individual switches such as 10A,10B,12A,12B, 13A or 13B on each output signal line.

In the conventional trailer system, line 27 powers the trailer side marker lights. It is relatively unimportant which of the interconnect sockets 2A,3A,5A or 6A is selected to be energized through contacts 10B, or 13A and 13B because these connections power light systems and the configuration inquiry signal mode check will be fast enough (approximately 0.015 second) that the lights will not flicker. Thus, the system inquiry mode check is minimally intrusive.

The tractor electronic control unit 8 receives input signals from the standard tractor electrical package 20 through electrical taps on the normal tractor lines 34 as shown by the tractor electronic control unit normal signal lines 14. In this manner all normal input information from the tractor is available to the electronic control unit 8 so that the appropriate control signals can be outputted on the plurality of tractor electronic control unit output signal lines 25A and 25B when a trailer having the appropriate advanced electrical subsystems is connected to the tractor. The trailer electronic control unit 40 controls a plurality of switching devices 10A, 10B, 12A, 12B, 13A, 13B, 16, 16A, 16B, 16C, 44, 44A, 56, 66 to configure the tractor and trailer electrical systems to a new standardized operating mode. As explained supra, if a standard trailer is connected to the tractor, then the electronic control unit 8 closes the tractor normal signal switches 16,16A,16B and 16C and holds open the electronic control unit signal switches 10A,10B,12A,12B,13A and 13B so that the tractor and trailer operate in the normal fashion without advanced systems.

To determine whether the trailer has an advanced trailer electrical system 23, the tractor electronic control unit 8 closes the electronic control unit switch 10B and opens switches 16A, 16B and 16C by energizing the tractor signal switch control lines 21B and 11A.

Control line 21B is energized on a low duty cycle pulse width modulation (PWM) basis which is from the battery voltage during the inquiry code operating mode. The duty cycle is not sufficient to cause a high time averaged current to flow to the trailer system 28 lights connected through socket 2A and pin 2B through power line 53 and switch 44 however, it is sufficient to charge capacitor 62A through diode 62B in the trailer electronic control unit 23 and to supply the necessary small current to operate the trailer electronic control unit 40. When socket 2A and pin 2B needs to be energized with voltage full time, such as when the lights are on as sensed by the tractor control unit 8 through the tractor electronic control unit normal signal line 14, control line 21B then causes socket 2A to be energized full time.

When a predetermined time has elapsed, sufficient to charge capacitor 62A and operate the trailer electronic control unit 40, the tractor electronic control unit 8 closes switches 13A and 13B by energizing the tractor signal control line 17 and then outputs an inquiry code on the tractor electronic control unit output signal lines 25A and 25B that go to tractor connector sockets 5A and 6A which then travels to connector pins 5B and 6B and into the trailer electrical system. If the trailer system is a conventional trailer electrical system 19 there is no response to the inquiry data code (query code) from the trailer electrical system 19 and, as described supra, the tractor switches are configured to operate the trailer in a normal fashion.

If the trailer has an advanced trailer electrical system 23, the inquiry data code generated by the tractor electronic control unit 8 is connected to the trailer electronic control unit 40 through data lines 38A and 38B. The trailer electronic control unit 40 then energizes control line 45A to open switches 44A and then responds with a coded signal that is sent through high impedances 38C and 38D into the tractor electronic control unit 8 via the trailer connector pins 5B and 6B and tractor connector sockets 5A and 6A, whereupon the tractor electronic control unit 8 causes the tractor electrical system to be configured in an appropriate manner by causing the electronic control unit signal switches 12A and 12B to be closed and signal switches 13A and 13B to remain closed, and the power switch 10B to remain closed and the line 21A is energized to close power switch 10A and line 11 is energized to cause tractor normal signal switch 16 to open and switches 16A,16B and 16C are caused to remain open. The tractor electronic control unit 8 communicates with the trailer electronic control unit through the tractor electronic control unit signal lines 25A and 25B which can contain a variety of signal information as determined by the software residing in the tractor electronic control unit 8. Also outputted from the tractor electronic control unit is a variety of diagnostic codes which are outputted on lines 30A and 30B to an on board display system or to an external diagnostic system for monitoring and repair guidance. Also outputted from the electronic control unit 8 are data links 32A and 32B which can communicate to other electronic systems as needed.

Power switch 10A supplies battery voltage electrical power to the trailer system through tractor connector socket 3A then into trailer connector pin 3B which is then distributed to a plurality of switching devices in the second switching package 56. Nearly simultaneously to the actions of the tractor electronic control unit 8, trailer electronic control unit 40 energizes control line 50 to cause switches 56 to close and conduct power via the switch output lines 58 to the new electrical outputs 78 which supplies power to any on board advanced trailer system such as anti-lock brakes, trailer anti-swing, etc.

Output line 58 also conducts power to the trailer electronic control unit 40 and a plurality of switching devices in the switching package 66 which, when any switching device 66 closes by signal from the trailer electronic control unit 40 through third switch control lines 70, causes power to be conducted to any selected standard trailer electrical system as represented by the standard trailer electrical package 28.

Also, to provide for a voltage potential, a grounding system is established from the tractor ground through ground line 71 into tractor connector socket 1A which is mated to trailer connector pin 1B and runs to various systems through ground lines 72, 80, 82 and 84.

The tractor electronic control unit signal lines 25A and 25B contain a variety of signals generated by the tractor electronic control unit 8 and are connected via tractor connector sockets 5A and 6A to trailer connector pins 5B and 6B. The signal from trailer connector pins 5B and 6B are conducted to the trailer electronic control unit 40 through signal lines 38A and 38B which can carry multiplexed information between the trailer electronic control unit 40 and the truck electronic control unit 8. Signal lines 38A and 38B are relatively low impedance lines. Subsequent to establishing a communications partnership from the inquiry code and the coded signal response, conducting communications between the electronic control units 8 and 40 on low impedance lines adds to the overall reliability of the communications linkage.

The trailer electronic control unit 40 also controls a plurality of switching devices found in the standard distribution switches 44 and 44A which are held in an open state when the tractor electronic control unit 8 has established an inquiry response communication. Otherwise, they remain in a closed state. The trailer electronic control unit 40 upon connection of the tractor electrical connector 22 to the trailer electrical connector 24 receives battery voltage power from socket 2B and line 62 but until it receives an inquiry code via tractor connector sockets 5A and 6A and trailer connector pins 5B and 6B and thereby senses that the tractor does contain an advanced electrical system 15, the otherwise closed second plurality of switches 44 and 44A appropriately direct normal trailer functions to the standard trailer electrical package 28.

Again, when both the tractor and the trailer have advanced electrical systems, the trailer electronic control unit 40 will open switches 44 and 44A and energize appropriate elements of control line 70 whereupon the tractor 12 volt DC power will be conducted through the switch power line 64 into the switch output lines 68 and to the standard trailer electrical package 28 selectively according to the code signals received from the tractor electronic control unit 8 on lines 38A and 38B indicating the state of the standard tractor electrical package 20 as received through the tractor normal signal output lines 34. In this manner, the trailer auxiliary lights, tail and license lamp, turn signals, stop lights and side marker lights can be energized appropriately.

Additionally, the trailer electronic control unit 40 is connected to a diagnostic bus network 76 and a data bus network 77 which is also on the trailer. Other advanced systems on the trailer are also connected to the diagnostic bus network 76 and the data bus network 77. These advanced systems may be the aforementioned ABS system, trailer anti-swing, etc. or they may be elements of additional tractor-trailer electrical connection systems as herein disclosed which may be used for interconnecting trailer to trailers in doubles combination.

Trailer electronic control unit 40, through internal software algorithms, is capable of receiving the data and diagnostic signals and regenerating them and then outputting them on signal lines 38A,38B,39A and 39B for transmission to the tractor electronic control unit 8. Likewise, the tractor electronic control unit 8 may regenerate portions of the data signals it receives or transmits on lines 30A,30B,32A,32B, 25A,25B, or 26A or 26B. One of the uses for regenerating data would be to apply a marker to the information which would identify to which of several trailers in a combination the data belonged. Regeneration also allows for additions to the information stream which are required for intercommunication between tractor electronic control unit 8 and the trailer electronic control unit 40.

BRIEF SUMMARY OF THE INVENTION

The present invention utilizes the seven pin connector found in the current majority of production truck tractors and trailers to provide a communication link between the tractor and the trailer where the trailer incorporates the auxiliary systems monitor function to report abnormal functioning to the tractor operator. In this manner, compatibility between most all existing tractors and trailers is assured while providing the capability to electrically accommodate almost any advanced system requirements. Such a system is disclosed in U.S. Pat. No. 5,397,924 entitled "Truck Tractor and Trailer Electrical Communication System" the disclosure of which is hereby expressly incorporated by reference. No special knowledge of the tractor or the trailer equipment is required for proper electrical interconnection by the operator while providing the operation of the conventional trailer electrical system. The monitor function of the present invention allows for the proper interpretation of signals from a variety of auxiliary systems whose functional states are interpreted by a program residing in nonvolatile random access memory the result of which can be transmitted on the high speed data bus communication lines.

To provide the required enhanced communication and power transfer from the truck tractor to the trailer and the required feedback signals from the trailer systems to the tractor such as are often desirable for anti-lock braking or electronically enhanced braking and/or trailer anti-swing, one electronic control unit is located in the tractor and another electronic control unit resides in the trailer. These two electronic control units communicate with one another through the commonly used seven pin connector to configure a plurality of switches to cause the proper action between tractor and trailer and also to receive and process signals. Multiplexing technology, involving serially coded messages, is well known in the art and can be used over at least one communication line to provide control, feedback and monitoring information between the tractor and the trailer electronic control units. An example of multiplexing between a tractor and trailer is shown in U.S. Pat. No. 4,897,642 the disclosure of which is hereby expressly incorporated by reference. Also, diagnostic and high speed data can be transferred over the standard 7-pin connector between the tractor and one or more trailers. Thus, the commonly used seven pin connector remains in use while the two electronic control units, one being the tractor and a second being in the trailer, command a plurality of switches to open or close that channel electrical control of conventional trailer functions and the electrical power and communication for advanced systems.

Initially, a configuration inquiry code signal from the tractor electronic control unit is sent at frequent time intervals through the seven pin connector to the trailer. If the trailer does not have an advanced system electronic control unit, then no reply will be received and the tractor electronic control unit software causes the switching hardware to configure the tractor electronics to respond in a traditional fashion through the seven pin connector.

If electronic control units are present on both the tractor and trailer, then the trailer electronic control unit will respond to the configuration inquiry code signal and both electronic control units will activate their software and switching hardware to properly activate and control the conventional trailer turn signals, sidemarker, stop lamps, etc. and additionally to connect power and communications through the seven pin connector.

According to the present invention, a small amount of nonvolatile random access memory (NOVRAM) is added to the trailer electronic control unit which is preprogrammed to transmit an identification number and/or other storable information upon command. Location of the trailer can also be loaded and updated in the nonvolatile random access memory NOVRAM by some type of truck/trailer location determination system such as that disclosed in U.S. Pat. No. 5,014,206 the disclosure of which is hereby incorporated by reference. The trailer electronic control unit reads requested information from the nonvolatile random access memory NOVRAM and reformats and/or transmits the information via the 7 pin connector for interpretation by the truck electronic control unit or an external field programming or road-out unit. Location history and operating history of the trailer systems are other information that could be made available to and from the nonvolatile random access memory NOVRAM.

BRIEF DESCRIPTION OF THE DRAWINGS

FIG. 1 is a schematic view of a prior art tractor and trailer without a microprocessor based communication system;

FIG. 3 is a partial schematic of the electronic monitor circuit of the present invention connected to the second electronic control unit contained in a trailer;

FIG. 4 is software block diagram of a prior art tractor/trailer communication system;

FIG. 5 is a software block diagram of the present invention; and

FIG. 6 is a software block diagram of the present invention.

DESCRIPTION OF THE PREFERRED EMBODIMENT

Figure 2:
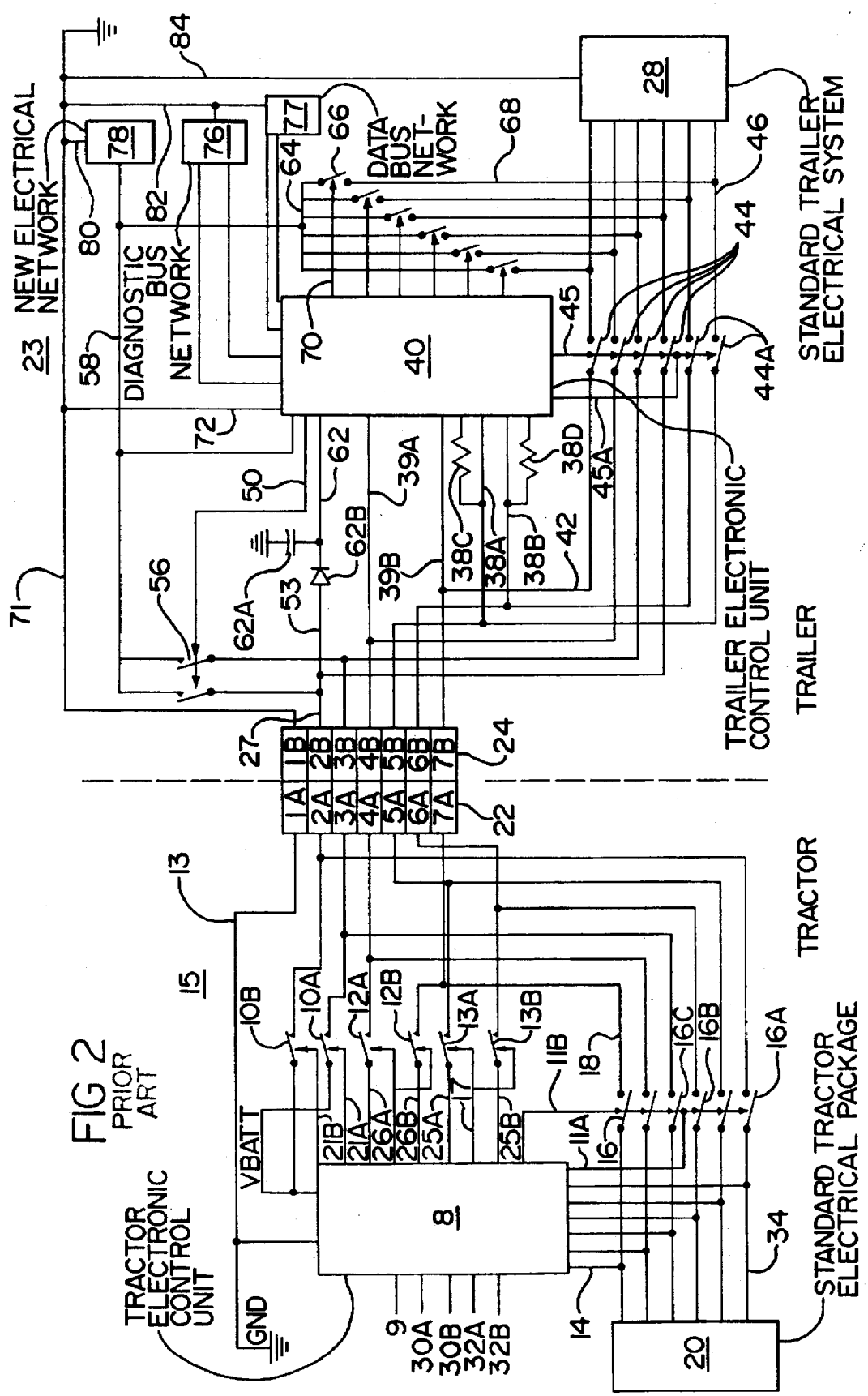
FIG. 2 is a schematic view of a prior art truck tractor and trailer electrical communication system having a first electronic control unit in a tractor joined to a trailer containing a second electronic control unit.

FIG. 3 is a schematic diagram of an advanced electrical communication system of the present invention for a truck tractor and trailer where only the trailer section is shown. The tractor electronic control unit 8 has been modified according to the present invention to include a nonvolatile random access memory (NOVRAM) programmable memory module 96 which contains a trailer identification code and possibly trailer location history information. Another function of the nonvolatile random access memory NOVRAM programmable memory module 96 could be to store sufficient information to interpret the significance of various switch openings and closings as set by various auxiliary systems outside of the data bus network 77 such as refrigeration units, heaters or pumps. No connection is made from these auxiliary systems to the data bus on the trailer and no data bus is needed to monitor the function of these auxiliary systems.

The programmable memory module 96 has the capability to store a preprogrammed trailer identification code to the trailer electronic control unit 40 for external communication through connector 24 to an external programming unit or another readout instrument. Also the identification code could be transmitted to the tractor electronic control unit 8 assuming the trailer is connected to a "smart" tractor having such a unit for display in the cab or transmission on a position reporting system or display on an external programming or display unit. Any of the information stored in the nonvolatile random access memory NOVRAM programmable memory unit 96 can be displayed or transmitted by the trailer electronic control unit 40. It is also contemplated that the nonvolatile random access memory NOVRAM could be packaged inside the trailer electronic control unit 40 and function in a similar fashion to that herein described.

The status of various trailer switches 90 used in these auxiliary systems is monitored by the trailer electronic control unit 40 and interpretation of this information is supplied by the nonvolatile random access memory NOVRAM programmable memory module 96 which has been preprogrammed to provide the necessary function information to the trailer electronic control unit 40. The trailer electronic control unit 40 then transmits the interpreted information over data lines 38A, 38B, 39A and/or 39B to the tractor electronic control unit 8 for possible reformatting and transmission to the tractor cab.

Auxiliary system switches as depicted by trailer switches 90 are either connected using a multiplexing unit (not shown) so that a plurality of switches 90 can be monitored using an input port on the trailer electronic control unit 40 (microprocessor). If sufficient input ports are available, then no multiplex unit is needed.

The software to monitor the state of the advanced electrical communication system could reside in the nonvolatile random access memory NOVRAM programmable memory module 96 which would transmit the appropriate interpretation of the state of the switches 90 to the trailer electronic control unit 40 and would also transmit a trailer identification code and then to a data bus which would provide this information to the tractor electronic control unit 8. An external programming system 96 could be connected either through the tractor electronic control unit 8 or to the trailer electronic control unit 40 through connector 24 to read not only the identification code but also reprogram the programmable memory module 96.

The external programming unit 86 would be used to reprogram the nonvolatile random access memory NOVRAM programmable memory module 96 to provide the proper interpretation of the auxiliary system switch 90 configuration and function to the trailer electronic control unit 40. The nonvolatile random access memory NOVRAM programmable memory module 96 would be accessed through the input/output connector 24 by mating connector 89 with individual lines 88 electrically connecting connector 89 to the external programming unit 86. The mating sockets 1C–7C and pins 1B–7B would provide the electrical link to the trailer electronic control unit 40 and the nonvolatile random access memory NOVRAM where the external programming unit 86 would supply a reprogram code on one or more pairs of the connector 24.

The programmable memory module 96 can be programmed through a communication line(s) such as through the high speed data link line 32A and 32B or through the electronic control unit diagnostic lines 30A and 30B or through the input/output connector 24 by the external programming unit. The external programming unit programs the programmable nonvolatile random access memory NOVRAM programmable memory module 96 so that the nonvolatile random access memory NOVRAM programmable memory module 96 can interpret the functioning of the auxiliary switches and output a message signal on communication lines 38A, 38B, 39A ad 39B for transmission to the tractor electronic control unit 8. The tractor electronic control unit 8 then generates a monitor signal on output line 9 for transmission to the tractor cab for reference by the operator and/or appropriate signals on the diagnostic data bus through lines 30A and 30B. Thus, in this manner, the trailer nonvolatile random access memory NOVRAM programmable memory module 96 can be selectively reprogrammed to properly interpret the functioning of switches 90 found in certain auxiliary systems and to communicate an identification code to the tractor or to the external programming unit for use by a fleet operator. The operation of the auxiliary system, such as a refrigeration unit, is monitored and its functional state communicated to the operator without connection to or use of a trailer data bus. Thus, using the present invention, the data bus network 77 would be optional and unnecessary for monitoring the functioning of auxiliary switches 90.

FIG. 4 shows a block diagram of a portion of the software residing in the prior art trailer electronic control unit 40 of FIG. 2 is shown. In step 120, the routine is initialized by a command to service the communication buses between the trailer electronic control unit 40 and the truck electronic control unit 8 and the trailer diagnostic bus network 76 and the trailer data bus network 77. Step 122 sets up the handshake between the tractor electronic control unit 8 and the trailer electronic control unit 40. In step 124, provision is made for the servicing of all of the aforementioned data and diagnostic buses including the power bus. In step 126, the trailer functions are serviced and finally in step 128 the sourcing of the tractor electronic control unit 8 is verified. If verified, then a loop back to the bus servicing, step 124 is established, and if not verified, a loop back to step 120 is established.

FIG. 5 is a block diagram of the software of the present invention residing in the electronic control unit 40 of FIG. 3 is shown. The change over the prior art software as described in reference to FIG. 4, consists of the addition of step 130 performed after step 124 which solicits a trailer identification number from the nonvolatile random access memory NOVRAM programmable memory module 96. In this manner, the trailer can be identified with a unique code number which can be used, among other uses, to track location, configuration, display and interpretation, maintenance and theft prevention.

FIG. 6 is a block diagram of an initialized subset of the software of the present invention as it resides in the trailer electronic control unit 40. This software loop is part of the initialization step 120 as shown in the block diagram of FIG. 6. In step 142, a reprogram code can be generated on the input/output connector 24 on the trailer electronic control unit 40 by a portable field reprogramming system (not shown). Step 142 looks for this reprogram code and, if present, directs the program to step 150 when the test code is detected. In step 152 the code is checked for validity and if valid, the code is stored in the nonvolatile random access memory NOVRAM programmable memory module 96 in step 156 and acceptance is acknowledged in step 158. In step 152, if the code is not a good code, then the code is rejected and acknowledged in step 154. After code acceptance or rejection acknowledgment in step 158 or 154, the program is routed to step 144 to check for presence of a query code. The query code referred to in steps 144 and 146 is a code sent on specific output pins of connector 22 by the tractor electronic control unit 8 as previously described while the reprogram code referred to in step 142 is a different code sent on different inputs to the tractor electronic control unit 8 by an external programming unit (field programming system) attached to the input/output connector 24 as shown in FIG. 2 or through the data links 32A and 32B or the lines 30A and 30B. The external programming unit (not shown) would be portable and could provide both power and a temporal code to the trailer electronic control system 40 through the connector 24.

Returning to step 142, if no reprogram code is detected, then the program goes to step 144 to check for a query code or the input. The function of the query code originates from the tractor electronic control unit 8 and its purpose is discussed supra. If a query code is detected, then the code is acknowledged in step 146 and the program continues (step 148) and a response is generated etc.

If a query code is not detected on connector 24, per step 144, then the program loops back to step 142.

The description of the preferred embodiment of the present invention is by way of example only. Various modifications and rearrangement of components are contemplated without departing from the spirit in the scope of the invention as here and after claimed.

What is claimed is:

1. A method of controlling and monitoring the function of trailer auxiliary systems comprising:

providing a tractor electronic control unit for generating and receiving and processing electrical signals, said trailer auxiliary system connected to a tractor electrical system and having a plurality of signal lines and at least one power output line;

providing a trailer electronic control unit electrically connected to said tractor electronic control unit for generating and receiving electrical signals and electrically connected to said power output line;

providing at least one data bus;

providing at least one diagnostic bus;

providing a programmable memory unit electrically connected to said trailer electronic control unit, said programmable memory unit containing at least one identification code;

initializing said tractor electronic control unit by initializing a random access address from said programmable memory unit and reading a reprogram code and storing said reprogram code in said programmable memory unit and acknowledging acceptance of said reprogram code:

initializing said trailer electronic control unit;

establishing electrical communication between said tractor and trailer electronic control units;

responding to said data buses;

responding to said diagnostic buses;

soliciting trailer identification from said programmable memory unit; and responding to the trailer auxiliary system.

* * * * *